(12) United States Patent
Pulikkaseril et al.

(10) Patent No.: US 11,740,361 B2
(45) Date of Patent: Aug. 29, 2023

(54) OPTICAL BEAM DIRECTOR

(71) Applicant: Baraja Pty Ltd, Lindfield West (AU)

(72) Inventors: Cibby Pulikkaseril, Lindfield West (AU); Federico Collarte Bondy, Lindfield West (AU)

(73) Assignee: BARAJA PTY LTD, Lindfield West (AU)

( * ) Notice: Subject to any disclaimer, the term of this patent is extended or adjusted under 35 U.S.C. 154(b) by 0 days.

(21) Appl. No.: 17/885,085

(22) Filed: Aug. 10, 2022

(65) Prior Publication Data

US 2023/0029264 A1    Jan. 26, 2023

Related U.S. Application Data

(63) Continuation of application No. 16/643,424, filed as application No. PCT/AU2018/050961 on Sep. 6, 2018, now Pat. No. 11,448,764.

(30) Foreign Application Priority Data

Sep. 6, 2017 (AU) ................................ 2017903597

(51) Int. Cl.
| | | |
|---|---|---|
| *G01S 17/89* | (2020.01) | |
| *G01S 7/481* | (2006.01) | |
| *G02B 26/10* | (2006.01) | |
| *G02B 6/293* | (2006.01) | |
| *F21V 8/00* | (2006.01) | |
| *G02B 6/28* | (2006.01) | |
| (Continued) | | |

(52) U.S. Cl.
CPC ............ *G01S 17/89* (2013.01); *G01S 7/4817* (2013.01); *G02B 6/0016* (2013.01); *G02B 6/0026* (2013.01); *G02B 6/29386* (2013.01); *G02B 26/10* (2013.01); *G02B 6/2861* (2013.01); *G02B 6/354* (2013.01); *G02F 1/0063* (2013.01)

(58) Field of Classification Search
None
See application file for complete search history.

(56) References Cited

U.S. PATENT DOCUMENTS

| | | |
|---|---|---|
| 3,271,486 A | 9/1966 | Dunlop |
| 3,825,340 A | 7/1974 | Debart |
| 3,953,667 A | 4/1976 | Layton et al. |

(Continued)

FOREIGN PATENT DOCUMENTS

| | | |
|---|---|---|
| DE | 4427352 | 1/1996 |
| EP | 0164181 | 12/1985 |

(Continued)

OTHER PUBLICATIONS

U.S. Appl. No. 16/467,319, Notice of Allowance dated Jul. 16, 2021, 8 pages.

(Continued)

*Primary Examiner* — Jerry Rahll
(74) *Attorney, Agent, or Firm* — Kilpatrick Townsend & Stockton LLP

(57) ABSTRACT

Described herein is a system for directing light over two dimensions. In a first embodiment, an optical beam director includes a wavelength router, such as an optical interleaver, optically coupled to an array of dispersive elements, such as free-space diffractive couplers. In a second embodiment, an optical beam director includes a diffractive element optically coupled to a 1D-to-2D spatial interleaver.

11 Claims, 8 Drawing Sheets

(51) Int. Cl.
  *G02B 6/35* (2006.01)
  *G02F 1/00* (2006.01)

(56) References Cited

U.S. PATENT DOCUMENTS

| | | | |
|---|---|---|---|
| 4,628,501 A | 12/1986 | Loscoe | |
| 4,845,703 A | 7/1989 | Suzuki | |
| 4,937,539 A | 6/1990 | Grinberg et al. | |
| 5,247,309 A | 9/1993 | Reich | |
| 5,305,132 A | 4/1994 | Fasen et al. | |
| 5,583,683 A | 12/1996 | Scobey | |
| 5,686,722 A | 11/1997 | Dubois et al. | |
| 5,835,203 A | 11/1998 | Ogura et al. | |
| 5,877,851 A | 3/1999 | Stann et al. | |
| 6,031,658 A | 2/2000 | Riza | |
| 6,147,760 A | 11/2000 | Geng | |
| 6,263,127 B1 | 7/2001 | Dragone et al. | |
| 6,278,538 B1 | 8/2001 | Schleipen | |
| 6,339,661 B1 | 1/2002 | Kokkelink et al. | |
| 6,377,720 B1 | 4/2002 | Kokkelink | |
| 6,687,036 B2 | 2/2004 | Riza | |
| 7,489,865 B2 | 2/2009 | Varshneya et al. | |
| 7,532,311 B2 | 5/2009 | Henderson et al. | |
| 7,804,056 B2 | 9/2010 | Bishop | |
| 7,831,298 B1 | 11/2010 | Wang et al. | |
| 7,969,558 B2 | 6/2011 | Hall | |
| 7,986,397 B1 | 7/2011 | Tiemann et al. | |
| 8,159,680 B2 | 4/2012 | Robinson et al. | |
| 8,440,952 B2 | 5/2013 | Jalali et al. | |
| 8,599,381 B2 | 12/2013 | Statz et al. | |
| 8,701,482 B2 | 4/2014 | Tsadka et al. | |
| 9,246,589 B2 | 1/2016 | Koonen et al. | |
| 9,432,115 B2 | 8/2016 | Roberts | |
| 9,684,076 B1 | 6/2017 | Feldkhun | |
| 9,723,386 B1 | 8/2017 | Ni et al. | |
| 10,527,727 B2 | 1/2020 | Bondy et al. | |
| 10,545,289 B1 | 1/2020 | Chriqui et al. | |
| 10,564,521 B1 | 2/2020 | Zhu et al. | |
| 10,585,194 B1 | 3/2020 | Zhu et al. | |
| 10,983,273 B1 | 4/2021 | Phare | |
| 11,162,789 B2 | 11/2021 | Lodin et al. | |
| 11,397,082 B2 | 7/2022 | Lodin et al. | |
| 11,448,764 B2 | 9/2022 | Pulikkaseril et al. | |
| 2002/0126945 A1 | 9/2002 | Konishi et al. | |
| 2003/0179804 A1 | 9/2003 | Cook et al. | |
| 2004/0086214 A1 | 5/2004 | Huang et al. | |
| 2005/0024640 A1 | 2/2005 | Fateley et al. | |
| 2007/0103699 A1 | 5/2007 | Kohnen et al. | |
| 2007/0177841 A1 | 8/2007 | Danziger | |
| 2007/0181810 A1 | 8/2007 | Tan et al. | |
| 2008/0036974 A1 | 2/2008 | Ihar et al. | |
| 2008/0208472 A1 | 8/2008 | Morcom | |
| 2009/0002680 A1 | 1/2009 | Ruff et al. | |
| 2011/0106324 A1 | 5/2011 | Tsadka et al. | |
| 2011/0199621 A1 | 8/2011 | Robinson et al. | |
| 2011/0286749 A1 | 11/2011 | Schoon | |
| 2013/0044309 A1 | 2/2013 | Dakin et al. | |
| 2013/0242400 A1 | 9/2013 | Chen | |
| 2013/0278939 A1 | 10/2013 | Pfister et al. | |
| 2013/0315604 A1 | 11/2013 | Lopresti et al. | |
| 2014/0078298 A1 | 3/2014 | Kudenov et al. | |
| 2014/0240691 A1 | 8/2014 | Mheen et al. | |
| 2014/0248058 A1 | 9/2014 | Simpson et al. | |
| 2015/0025709 A1 | 1/2015 | Spaulding et al. | |
| 2015/0043009 A1 | 2/2015 | Bridges et al. | |
| 2015/0086198 A1 | 3/2015 | Frisken et al. | |
| 2015/0192677 A1 | 7/2015 | Yu et al. | |
| 2016/0041266 A1 | 2/2016 | Smits | |
| 2016/0047890 A1 | 2/2016 | Ryan et al. | |
| 2016/0282449 A1 | 9/2016 | Slobodyanyuk | |
| 2016/0291156 A1 | 10/2016 | Hjelmstad | |
| 2016/0294472 A1 | 10/2016 | Palmer et al. | |
| 2016/0327648 A1 | 11/2016 | Lipson et al. | |
| 2017/0023661 A1 | 1/2017 | Richert | |
| 2017/0025753 A1 | 1/2017 | Driscoll et al. | |
| 2017/0090031 A1 | 3/2017 | Bondy et al. | |
| 2017/0153319 A1 | 6/2017 | Villeneuve et al. | |
| 2017/0155225 A1 | 6/2017 | Villeneuve et al. | |
| 2018/0031680 A1 | 2/2018 | Lee et al. | |
| 2019/0271821 A1 | 9/2019 | Moebius et al. | |
| 2019/0310377 A1 | 10/2019 | Lodin et al. | |
| 2020/0081128 A1 | 3/2020 | Bondy et al. | |
| 2020/0363633 A1 | 11/2020 | Pulikkaseril et al. | |
| 2021/0116703 A1 | 4/2021 | Pulikkaseril et al. | |
| 2021/0157009 A1 | 5/2021 | Bondy et al. | |
| 2021/0247497 A1 | 8/2021 | Li et al. | |
| 2021/0381829 A1 | 12/2021 | Lodin et al. | |
| 2022/0050187 A1 | 2/2022 | Yao | |

FOREIGN PATENT DOCUMENTS

| | | |
|---|---|---|
| EP | 0811855 | 12/1997 |
| EP | 1065551 | 1/2001 |
| EP | 2107410 | 10/2009 |
| EP | 2212717 | 3/2015 |
| EP | 2866051 | 4/2015 |
| EP | 3081956 | 10/2016 |
| JP | 08285942 | 11/1996 |
| JP | 2003315570 | 11/2003 |
| JP | 2008506927 | 3/2008 |
| JP | 2009222616 | 10/2009 |
| JP | 2010048662 | 3/2010 |
| JP | 2011085610 | 4/2011 |
| JP | 2013186358 | 9/2013 |
| JP | 2014505861 | 3/2014 |
| JP | 2015059989 | 3/2015 |
| WO | 03009032 | 1/2003 |
| WO | 2005109075 | 11/2005 |
| WO | 2011036553 | 3/2011 |
| WO | 2014136110 | 9/2014 |
| WO | 2015018836 | 2/2015 |
| WO | 2015059244 | 4/2015 |
| WO | 2016097409 | 6/2016 |
| WO | 2017054036 | 4/2017 |
| WO | 2017176901 | 10/2017 |
| WO | 2018090085 | 5/2018 |
| WO | 2018107237 | 6/2018 |
| WO | 2019036766 | 2/2019 |
| WO | 2019046895 | 3/2019 |
| WO | 2019232585 | 12/2019 |

OTHER PUBLICATIONS

U.S. Appl. No. 16/467,319, Supplemental Notice of Allowance dated Sep. 15, 2021, 2 pages.
U.S. Appl. No. 16/467,319, Supplementary Notice of Allowability dated Sep. 30, 2021, 3 pages.
U.S. Appl. No. 16/641,587, Non-Final Office Action dated Aug. 4, 2022, 15 pages.
U.S. Appl. No. 16/643,424, Corrected Notice of Allowability dated Aug. 12, 2022, 2 pages.
U.S. Appl. No. 16/643,424, Notice of Allowance dated May 11, 2022, 9 pages.
U.S. Appl. No. 17/412,149, Notice of Allowance dated Mar. 22, 2022, 5 pages.
U.S. Appl. No. 17/412,149, Notice of Allowance dated Nov. 30, 2021, 8 pages.
U.S. Appl. No. 17/691,489, Non-Final Office Action dated Jun. 7, 2022, 11 pages.
Australian Patent Application No. 2016905228, International-Type Search for Provisional Patent Application, Jun. 16, 2017, 9 pages.
Australian Patent Application No. 2017903440 filed on May 24, 2018, 11 pages.
Bass et al., Handbook of Optics—Devices, Measurements & Properties, McGraw-Hill, 2nd edition, 1995, 1496 pages.
Dieckmann, FMCW-LIDAR with Tunable Twin-Guide Laser Diode, Electronics Letters, vol. 30, No. 4, Feb. 17, 1994, 2 pages.
Doylend et al., Hybrid III/V Silicon Photonic Source with Integrated 1 D Free-Space Beam Steering, Optics Letters, vol. 37, No. 20, Oct. 15, 2012, pp. 4257-4259.

(56) References Cited

OTHER PUBLICATIONS

European Application No. 17880429.0, Extended European Search Report dated Jul. 13, 2020, 8 pages.
European Application No. 18849158.3, Extended European Search Report dated Mar. 29, 2021, 8 pages.
European Application No. 18854078.5, Supplementary European Search Report dated Apr. 29, 2021, 9 pages.
Gao et al., Complex-Optical-Field Lidar System for Range and Vector Velocity Measurement, Optics Express, vol. 20, No. 23, Nov. 5, 2012, pp. 25867-25875.
Hulme et al., Fully Integrated Hybrid Silicon Two-Dimensional Beam Scanner, Optics Express, vol. 23, No. 5, Mar. 9, 2015, pp. 5861-5874.
Japanese Application No. 2019-530217, Office Action dated Aug. 25, 2021, 9 pages (3 pages of Original Document and 6 pages of English Translation).
Japanese Application No. 2020-511278, Office Action dated Jun. 22, 2022, 8 pages (6 pages of Original and 8 pages of English Translation).
Japanese Application No. 2020-511771, Office Action dated Jun. 22, 2022, 8 pages (6 pages of Original and 8 pages of English Translation).
Komljenovic et al., Sparse Aperiodic Arrays for Optical Beam Forming and LIDAR, Optics Express, vol. 25, No. 3, Feb. 6, 2017, pp. 2511-2528.
Palmer, Diffraction Grating Handbook, Richardson Gratings, 6th edition, 2005, 271 pages.
International Application No. PCT/AU2016/050899, International Preliminary Report on Patentability dated Apr. 3, 2018, 5 pages.
International Application No. PCT/AU2016/050899, International Search Report and Written Opinion dated Nov. 25, 2016, 8 pages.
International Application No. PCT/AU2017/051395, International Search Report and Written Opinion dated Feb. 27, 2018, 12 pages.
International Application No. PCT/AU2017/903597, International Search Report and Written Opinion dated May 23, 2018, 10 pages.
International Application No. PCT/AU2018/050901, International Search Report and Written Opinion dated Nov. 2, 2018, 11 pages.
International Application No. PCT/AU2018/050961, International Search Report and Written Opinion dated Oct. 25, 2018, 11 pages.
International Application No. PCT/AU2019/050437, International Search Report and Written Opinion dated Jul. 17, 2019, 8 pages.
International Application No. PCT/AU2019/050583, International Search Report and Written Opinion dated Sep. 13, 2019, 15 pages.
Pierrottet et al., Linear FMCW Laser Radar for Precision Range and Vector Velocity Measurements, MRS Online Proceeding Library Archive, Jan. 2008, 9 pages.
Quack et al., Development of an FMCW LADAR Source Chip using MEMS-Electronic—Photonic Heterogeneous Integration, GOMACTech, Mar. 31-Apr. 3, 2014, 4 pages.
Sun et al., Large-Scale Integrated Silicon Photonic Circuits for Optical Phased Arrays, Advanced Photonics for Communications, OSA Technical Digest (online) (Optica Publishing Group, 2014), Jul. 13-17, 2014, 3 pages.
Watanabe et al., Low-Loss Wavelength Routing Optical Switch Consisting of Small Matrix Switch and Cyclic Arrayed-Waveguide Gratings for Colorless Add/Drop, Japanese Journal of Applied Physics, vol. 53, Jul. 2, 2014, 5 pages.
Wei et al., Design Optimization of Flattop Interleaver and Its Dispersion Compensation, Optics Express, vol. 15, No. 10, May 14, 2007, pp. 6439-6457.

OPTICAL BEAM DIRECTOR

RELATED APPLICATION

This application is a continuation of U.S. application Ser. No. 16/643,424, filed Feb. 28, 2020, which claims priority to International Application No. PCT/AU2018/050961, filed Sep. 6, 2018, which claims ultimate priority to Australian Patent Application No. 2017903597, filed Sep. 6, 2017, the contents of which are incorporated herein in its entirety.

FIELD OF THE DISCLOSURE

The present disclosure generally relates to a system and method for directing an optical beam. More particularly, the present disclosure relates to a system and method for directing an optical beam in two dimensions. Particular embodiments relate to directing light into an environment having a depth dimension over two dimensions.

BACKGROUND OF THE DISCLOSURE

Optical beam direction has several uses, including but not limited to LiDAR (light detection and ranging) applications, in which light is sent into an environment for mapping purposes. In three-dimensional mapping, one of the dimensions relates to the range of a point from the origin of the optical beam, whereas the other two dimensions relate to two dimensional space (e.g. in Cartesian (x, y) or polar (r, theta) coordinates) in which the optical beam is steered across. An example LiDAR use of optical beam direction is described in WO 2017/054036.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE DISCLOSURE

According to one aspect of the disclosure, there is provided an optical system for directing light over two dimensions, the two dimensions comprising a first dimension and a second dimension substantially perpendicular to the first dimension, the light including a selected one of multiple wavelength channels grouped into groups of non-neighbouring wavelength channels, the system including:

a wavelength router for routing the light from a first port to one of second ports based on the selected wavelength channel, the second ports being (a) arranged to direct the routed light across a wavelength dimension associated with the first dimension and (b) each associated with a respective one of the groups of non-neighbouring wavelength channels; and an array of dispersive elements arranged to each receive the routed light from the respective one of the second ports, each of the array of dispersive elements configured to direct the received light across the second dimension.

According to another aspect of the disclosure, there is provided an optical system for directing light over a first dimension and a second dimension substantially perpendicular to the first dimension, the light including a selected one of multiple wavelength channels, the system including:

a dispersive element arranged to direct the light over a wavelength dimension based on the selected one of the multiple wavelength channels; and a spatial router for routing the light from one of multiple first ports to one of multiple second ports, the multiple first ports being arranged in accordance with the wavelength dimension, the multiple second ports being arranged along two dimensions associated with the first dimension and the second dimension.

According to another aspect of the disclosure, there is provided a spatial profiling system for profiling an environment having a depth dimension over two dimensions, the system including:

an embodiment of the optical system described in the immediately preceding paragraphs;

a light source optically coupled to the optical system for providing the light; and a processing unit operatively coupled to the optical system for determining the depth dimension of the environment over the two dimensions.

Further aspects of the present disclosure and further embodiments of the aspects described in the preceding paragraphs will become apparent from the following description, given by way of example and with reference to the accompanying drawings.

DETAILED DESCRIPTION OF EMBODIMENTS

Described herein are embodiments of an optical system for directing light over two dimensions. The two dimensions comprise a first dimension (e.g. along the y-axis or vertical direction) and a second dimension (e.g. along the x-axis or horizontal direction) substantially perpendicular to the first dimension. The described system is capable of steering light based on one or more selected wavelength channels and without mechanically moving parts. While the following description refers to selecting a single wavelength channel (e.g. by tuning a wavelength-tunable laser), a person skilled in the art would appreciate that the description is also applicable, with minor modifications (e.g. optically coupling together two or more wavelength-tunable lasers), to select two or more wavelength channels.

Steerability in terms of scanning speed, directional stability and spatial resolution therefore depends on the wavelength-tuning speed, wavelength stability and wavelength-resolution, respectively. The described system can be useful in reducing dependence on mechanical performance, such as reducing occurrences or impact of mechanical failure or mechanical fatigue, due to its static nature.

The described embodiments can be used a beam director, for example, in a spatial profiling arrangement for estimating the spatial profile (e.g. the z-axis or depth) of an environment. Other example applications for beam direction include spectrometry, optical line-of-sight communications, 2D scanning on manufacturing lines, projectors, 2D printers, adaptive illumination and so on. While the following description focusses on spatial profile estimation, a person skilled in the art would appreciate that the description is, with minor modification, also applicable to the other beam direction applications.

Figure 1:
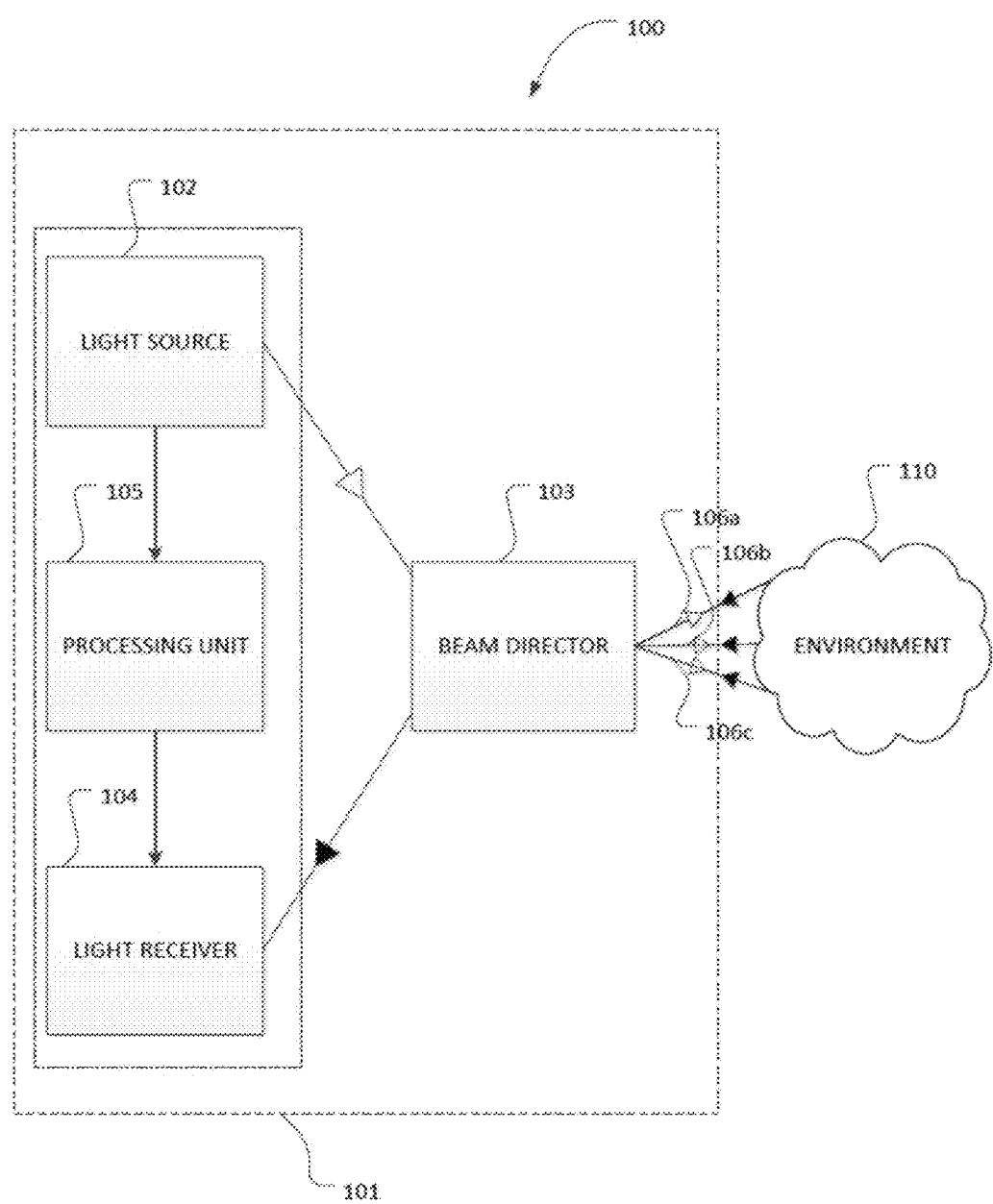
FIG. 1 illustrates a module for spatially profiling an environment.

FIG. 1 illustrates an example of a spatial profiling arrangement 100. The arrangement 100 includes a light source 102, a beam director 103, a light receiver 104 and a processing unit 105. In the arrangement of FIG. 1, outgoing light from the light source 102 is directed by the beam director 103 in a direction in two dimensions into an environment 110 having a spatial profile. If the outgoing light hits an object or a reflecting surface, at least part of the outgoing light may be reflected (represented in solid arrows), e.g. scattered, by the object or reflecting surface back to the beam director 103 and received at the light receiver 104. The processing unit 105 is operatively coupled to the light source 102 for controlling its operations. The processing unit 105 is also operatively coupled to the light receiver 104 for determining the distance to the reflecting surface, by determining the round-trip distance travelled by the reflected light.

The light source 102, the beam director 103, the light receiver 104 may be optically coupled to one another via free-space optics and/or optical waveguides such as optical fibres or optical circuits in the form of 2D or 3D waveguides (see more below). Outgoing light from the light source 102 is provided to the beam director 103 for directing into the environment. Any reflected light collected by the beam director 103 may be directed to the light receiver 104. In one example, light from the light source 102 is also provided to the light receiver 104 for optical processing purposes via a direct light path (not shown) from the light source 102 to the light receiver 104. For example, the light from the light source 102 may first enter a sampler (e.g. a 90/10 fibre-optic coupler), where a majority portion (e.g. 90%) of the light is provided to the beam director 103 and the remaining sample portion (e.g. 10%) of the light is provided to the light receiver 104 via the direct path. In another example, the light from the light source 102 may first enter an input port of an optical switch and exit from one of two output ports, where one output port directs the light to the beam director 103 and the other output port re-directs the light to the light receiver 104 at a time determined by the processing unit 105. Techniques for determining the spatial profile of an environment are described in the applicant's international application no. PCT/AU2016/050899 (published as WO 2017/054036), the contents of which are incorporated herein in its entirety.

Figure 2A:
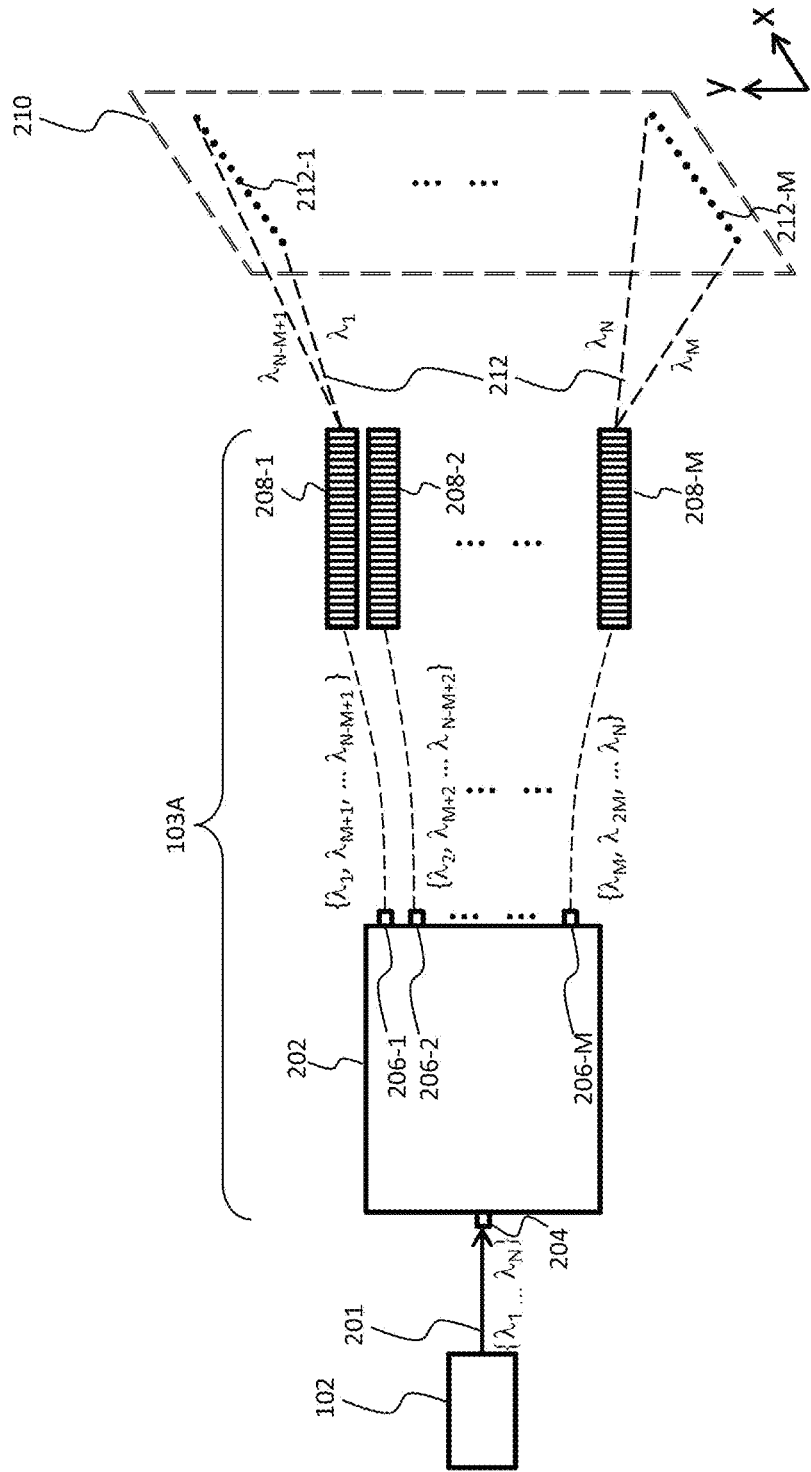
FIGS. 2A and 2B illustrates schematically a first embodiment of an optical beam director.

FIG. 2A illustrates an embodiment 103A of the beam director 103 of FIG. 1. The light 201 from the light source 102 includes a selected one of N wavelength channels grouped into M groups of non-neighbouring wavelength channels. The light source 102 may be a wavelength-tunable laser, allowing selection of the desired wavelength channel via an electronic control signal. Each group of non-neighbouring wavelength channels include non-consecutive wavelength channels. The M groups of non-neighbouring wavelength channels may be interleaved wavelength channels. In one example, where the N wavelength channels are designated by their centre wavelengths $\lambda_1, \lambda_2, \ldots \lambda_N$, the M groups of interleaved wavelength channels are $\{\lambda_1, \lambda_{M+1}, \ldots, \lambda_{N-M+1}\}$, $\{\lambda_2, \lambda_{M+2} \ldots \lambda_{N-M+2}\}, \ldots$ and $\{\lambda_M, \lambda_{2M}, \ldots, \lambda_N\}$. That is, in this example, each group include evenly spaced wavelengths channel (in this case, every M wavelength channels), and all M groups have the same spacing. In another example, the non-neighbouring wavelength channels may be non-interleaved wavelength channels, but still spread almost from $\lambda_1$ to $\lambda_N$ (e.g. $\{\lambda_1, \ldots, \lambda_N\}$, $\{\lambda_2, \ldots \lambda_{N-2}\}, \ldots$ and $\{\lambda_M, \ldots \lambda_{N-M}\}$). In either example, each group of interleaved wavelength channels spreads almost from $\lambda_1$ to $\lambda_N$, the tunable range of the light source 102. As explained below, this large spread of wavelength channels, by grouping non-neighbouring wavelength channels, allows for greater range of directional steering for a given dispersion of the beam director 103.

The exemplified beam director 103A includes a wavelength router 202 (e.g. an optical interleaver) for routing light 201 of a group of non-neighbouring wavelength channels from a first port 204 to one of second ports 206-1, 206-2 ... 206-M (collectively 206). The routing is based on the selected wavelength channel. For example, in an interleaving arrangement, the beam exemplified director 103A is configured to route the first M consecutive wavelength channels to the respective M second ports. That is, $\lambda_1$ is routed to port 206-1, $\lambda_2$ is routed to port 206-2, ... and $\lambda_M$ is routed to port 206-M. Further, the beam director 103A is configured to route the second M consecutive wavelength channels to the respective M second ports. That is, $\lambda_{M+1}$ is routed to port 206-1, $\lambda_{M+2}$ is routed to port 206-2, ... and $\lambda_{2M}$ is routed to port 206-M. The exemplified beam director 103A is configured for similar routing for the rest of the wavelength channels. That is, in the interleaving arrangement, each subsequent lot of M consecutive wavelength channels are routed to respective M second ports. In effect, each second port is associated with a respective one of the groups of non-neighbouring wavelength channels $\lambda_{kM+n}$, where $k \in 0$ to N-1, and n represents a designated second port. For example, the exemplified beam director 103A is configured to route the light 201 at any of the wavelength channels $\lambda_{kM+1}$ to the port 206-1, wavelength channels $\lambda_{kM+2}$ to port 206-2 ... and wavelength channels $\lambda_{(k+1)M}$ to port 206-M.

The second ports 206 are arranged to direct the routed light across a wavelength dimension. This wavelength dimension may be, related to, or otherwise associated with the first dimension (e.g. along the y-axis of FIG. 2A or the vertical direction). In FIG. 2A, the association arises from the arrangement of physical separation of the second ports 206 to allow independent direction of the outgoing light along the y-axis. The beam director 103A further includes an array of dispersive elements 208-1, 208-2 . . . 208-M (collectively 208) arranged to each receive the routed light from the respective one of the second ports 206. The dispersive elements 208 is optically coupled (e.g. via one or more of waveguide-coupling, fibre-coupling and free-space-coupling mechanisms (including collimating elements)) to the second ports 206 to receive the routed light. The optical coupling is represented as dashed lines in FIG. 2. Each of the array of dispersive elements 208 is configured to further direct the received light across the second dimension (e.g. along the x-axis of FIG. 2A or the horizontal direction). In one example, one or more of the array 208 of dispersive elements each include a free-space diffractive coupler. Alternatively or additionally, the one or more of the array 208 of dispersive elements include a diffraction grating, a prism and a grism. Still alternatively or additionally, the dispersive elements 208 may each be a single element or multiple elements, with the dispersive elements 208 each being waveguide-coupled to the output ports 206 in a waveguide (M waveguides in total), and with the M waveguides all propagating through the same optical component. The beam director 103A may include one or more collimating elements to collimate the outgoing light 212 (represented in dashed lines in FIG. 2A) from the dispersive elements 208.

Figure 2B:
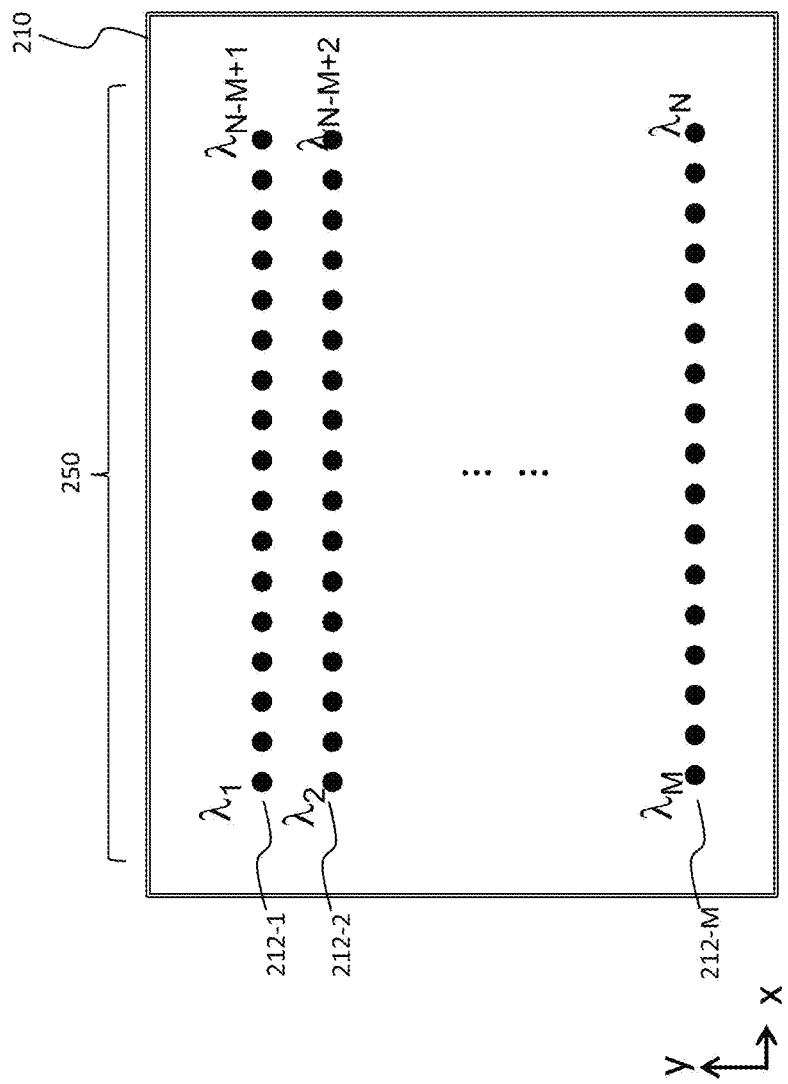
Figure 4:
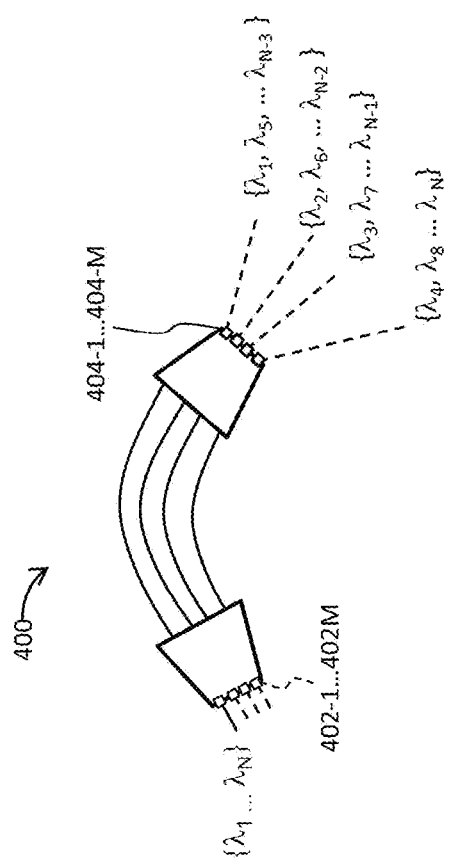
FIG. 4 illustrates an example of an arrayed waveguide grating.

For illustrative purposes, a screen 210 which is not part of the described system 103A is depicted in FIGS. 2A and 2B to depict the spatial distribution of the outgoing optical beam 212 when the selected wavelength is swept between $\lambda_1$ and $\lambda_N$. FIG. 2B illustrates schematically an illustrative image 250 of a screen 210 located at the output of the system 103A to intercept the outgoing light. Each dot in FIG. 2B represents a selected one of the wavelength channels $\lambda_1, \lambda_2, \ldots \lambda_N$. Note that each dot in practice appears independently based on the selected wavelength channel(s), but for illustration purposes all dots are depicted in FIG. 4 simultaneously as if they could be captured at the same time. The illustrative image 250 indicates M groups (212-1, 212-2 . . . 212-M) of light output. The number of dots per group is merely illustrative and does not represent the actual number. The M groups of light output correspond to the respective M dispersive elements 208-1, 208-2 . . . 208-M. These groups are distributed over the first dimension (e.g. y-axis), with each extending across the second dimension (e.g. x-axis) substantially perpendicular to the first dimension. The first dimension may not necessarily exactly coincide with the wavelength dimension (i.e. the dimension in which the light is directed to by the wavelength router 202), and the second dimension may not necessarily exactly coincide with dimension orthogonal to the wavelength dimension.

In a non-limiting example for illustrative purposes, the light source 102 may include a telecommunications-grade laser. A telecommunications-grade laser may have a wavelength-tunable range of 100 nm, such as from approximately 1527 nm to approximately 1567 nm (or about 5000 GHz at 1550 nm), tunable in steps of 0.0004 nm to 0.008 nm (or steps of about 50 MHz to 1 GHz at 1550 nm). For example, if the light source 102 is wavelength-tunable over 40 nm, there is a total of about 5000 steps (i.e. N=5000). The wavelength router 202 is an optical interleaver including eight (i.e. M=8) second ports, with each port associated with 625 interleaved wavelengths channels (e.g. $\lambda_1, \lambda_9, \lambda_{17} \ldots \lambda_{4992}$ being routed to one second port, $\lambda_2, \lambda_{10}, \lambda_{18} \ldots \lambda_{4993}$ being routed to another second port, and so on with $\lambda_8, \lambda_{16}, \lambda_{24} \ldots \lambda_{5000}$ being routed to the last second port). Due to the grouping of non-neighbouring wavelength channels into respective second ports, such as in groups of interleaved wavelength channels, each second port is configured to receive and direct light spanning almost the entire tunable range of the light source 120 (e.g. with $\lambda_1$ to $\lambda_{4992}$ spanning about 40 nm–(8×0.008 nm)=39.936 nm). In comparison, where neighbouring channels are otherwise grouped (e.g. $\lambda_1$ to $\lambda_{625}$ to the first second port, etc), each group span only a fraction (e.g. one-eighth) of the entire tunable range of the light source 120 (e.g. with $\lambda_1$ to $\lambda_{625}$ spanning about 40 nm/8=5.0 nm). Accordingly, not only does the grouping of the non-neighbouring wavelength channels into respective second ports facilitates beam direction across the first dimension, the grouped wavelength channels being non-neighbouring also allows for a greater spread of the range of wavelength channels and hence, for a given dispersion of the dispersive elements 208, an increase of beam divergence across the second dimension.

Figure 3A:
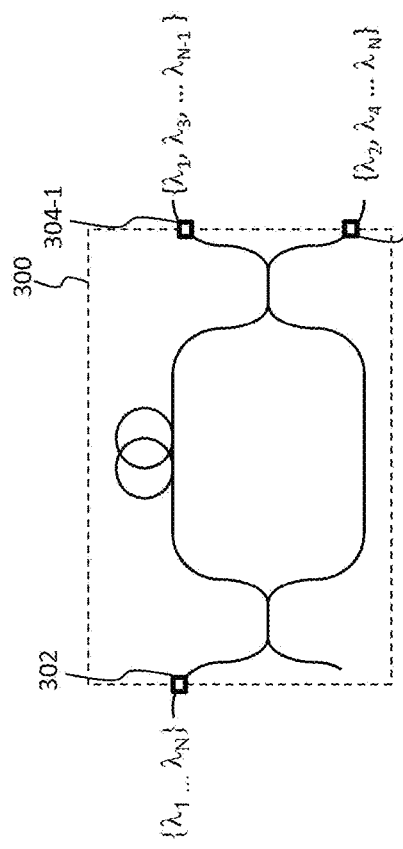
FIGS. 3A and 3B illustrate different arrangements of an optical interleaver.

In one arrangement, the optical interleaver 202 may include one or more Mach-Zehnder interferometers (MZIs). FIG. 3A illustrates an example of a MZI 300 in a 1-by-2 optical interleaver. The MZI 300 may be waveguide-based or fibre-based. The MZI 300 includes an input port 302 and two output ports 304-1 and 304-2 (collectively 304). The MZI includes a fixed path difference between the two arms of the interferometer such that light entering the input port 302 appears at one of the output ports 304 based on the wavelength channels. In one example, the input port 302 is configured to receive light of a wavelength channel $\{\lambda_1, \lambda_2, \ldots X_N\}$ and route the light to the output port 304-1, if the received wavelength channel is one of $\{\lambda_1, \lambda_3, \ldots \lambda_{N-1}\}$, or to the output port 304-2, if the received wavelength channel is one of $\{\lambda_2, \lambda_4, \ldots \lambda_N\}$. Using parameters in the numerical example above, the 1-by-2 optical interleaver may be implemented by configuring the MZI 300 to have a free spectral range (FSR) of 0.008 nm (or about 1 GHz at 1550 nm).

Figure 3B:
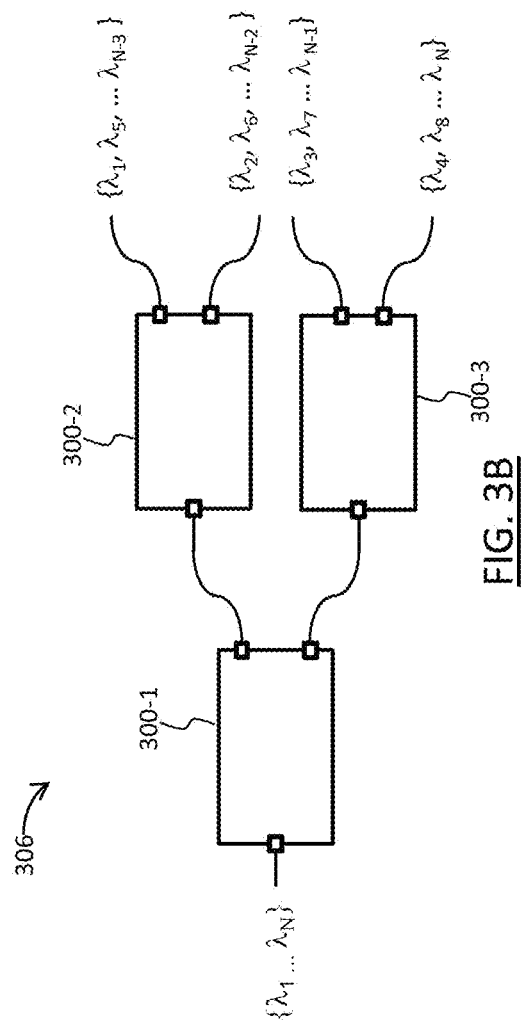

FIG. 3B illustrates a cascaded MZI 306 in a 1×4 optical interleaver. The cascaded MZI 306 includes three constituent MZIs 300-1, 300-2 and 300-3 each as illustrated in FIG. 3A. The two output ports of a preceding MZI 300-1 are optically coupled to the respective input ports of two succeeding MZIs 300-2 and 300-3. Each of the succeeding MZIs 300-2 and 300-3 include two output ports. The cascaded MZI 306 therefore includes a total of four output ports. Each constituent MZI in the cascaded MZI 306 has a respective path difference in their two interferometric arms to facilitate routing of wavelength channels in an interleaving manner. For example, the cascaded MZI 306 is configured to receive light of a wavelength channel $\{\lambda_1, \lambda_2, \ldots \lambda_N\}$ and route the light to output port number k (where $k \in \{1, 2, 3, 4\}$) if the received wavelength channel is one of $\{\lambda_k, \lambda_{k+4}, \lambda_{N-k+1}\}$. A skilled person would appreciate that a 1-by-M optical interleaver may be implemented using cascading Q constituent MZIs where $M=2^{Q-1}$ is the number of output ports, each associated with a group of interleaved wavelength channels. An output port number k (where $k \in \{1, 2, \ldots M\}$) receives routed light if the received wavelength channel is one of $\{\lambda_k, \lambda_{k+M}, \ldots \lambda_{N-M+1}\}$.

A skilled person would also appreciate that, in practice, cross-talk exists due to light being routed to unintended port. That is, in practice, an output port number k may receive a small amount of routed light even if the received wavelength channel is not one of $\{\lambda_k, \lambda_{k+M}, \ldots \lambda_{N-M+1}\}$. In one example, a level of cross-talk is about −30 dB or lower.

In another arrangement, the optical interleaver 202 may include one or more arrayed waveguide gratings (AWGs). In one example, the one or more AWGs include at least one cyclic AWG (sometimes known as colourless AWG). FIG. 4 illustrates an example of a M-by-M cyclic AWG 400. The cyclic AWG 400 may be waveguide-based or fibre-based. The cyclic AWG 400 includes multiple input ports 402-1 . . . 402-M and multiple output ports 404-1 . . . 404-M. For example, the cyclic AWG 400 is configured to receive light of a wavelength channel $\{\lambda_1, \lambda_2, \ldots \lambda_N\}$ at any of its input ports 402, and route the light to output port 404 number k if the received wavelength channel is one of $\{\lambda_k, \lambda_{k+M}, \ldots \lambda_{N-M+1}\}$. Cyclic AWGs typically has a smaller FSR, compared to that of non-cyclic AWGs, such that there is expected to be more routed wavelength channels per output port.

In yet another arrangement, the optical interleaver 202 may include one or more echelle demultiplexers.

In yet another arrangement, the optical interleaver 202 may include any combination of one or more MZIs, one or more AWGs, such as cyclic AWGs and one or more echelle demultiplexers.

Accordingly, the optical interleaver 202 includes M second ports, corresponding to the M groups of wavelength channels, each second port carrying M/N non-neighbouring channels. In one case, one of M and N/M is at least 8, 16 or 32. This case corresponds to a beam director where light is directed across one of the first and second dimensions over at least 8, 16 or 32 pixels (e.g. generating 8, 16 or 32 dots across x or y axis in FIG. 2B). For example, in an hereinbefore described arrangement, M is 8. In another example, M is 16. In yet another example, M is 32.

Further, an optical interleaver with a smaller FSR carries more wavelength channels per second port. In one use case, the FSR is designed to be no more than 10 GHz. In another use case, the FSR is designed to be no more than 5 GHz. In yet another use case, the FSR is designed to be no more than 1 GHz. For example, in an hereinbefore described arrangement, the FSR is 1 GHz.

Figure 5:
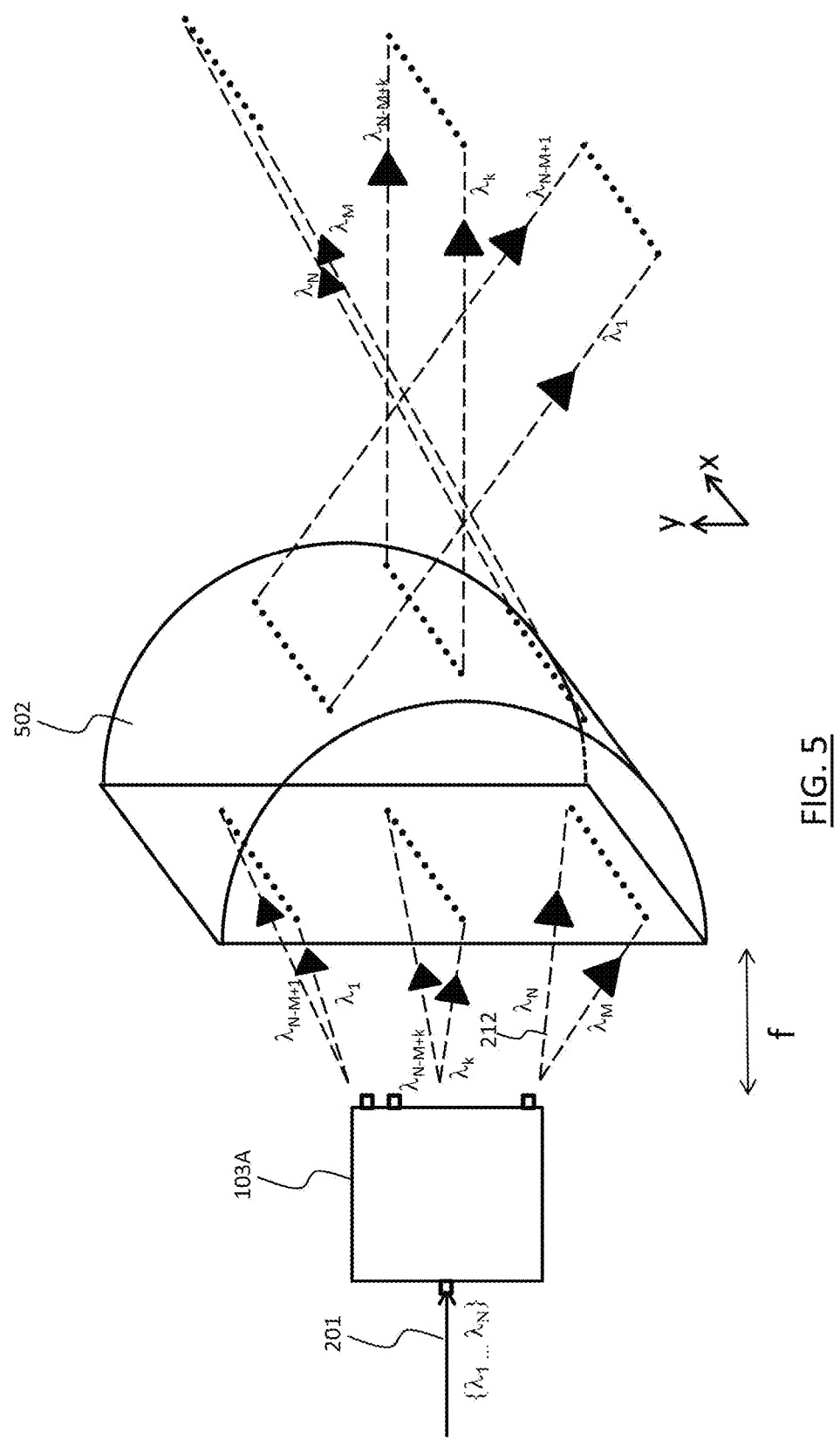
FIG. 5 illustrates the first embodiment of the beam director with a collimating element.

In one arrangement, as illustrated in FIG. 5, the beam director 103A may be optically coupled to or may further include a collimating element 502 to collimate the outgoing optical beam 212. For simplicity, only three planes of the outgoing optical beam 212 are shown. In one example, the collimating lens 502 includes a cylindrical lens. In this example, the dispersive elements 208 are located in or near the focal plane of cylindrical lens. Although not shown, if a screen is placed at the output of cylindrical lens, a similar distribution of FIG. 2B illustrates schematically an illustrative image 250 of a screen 210 located at the output of the system 103A to intercept the outgoing light.

Figure 6:
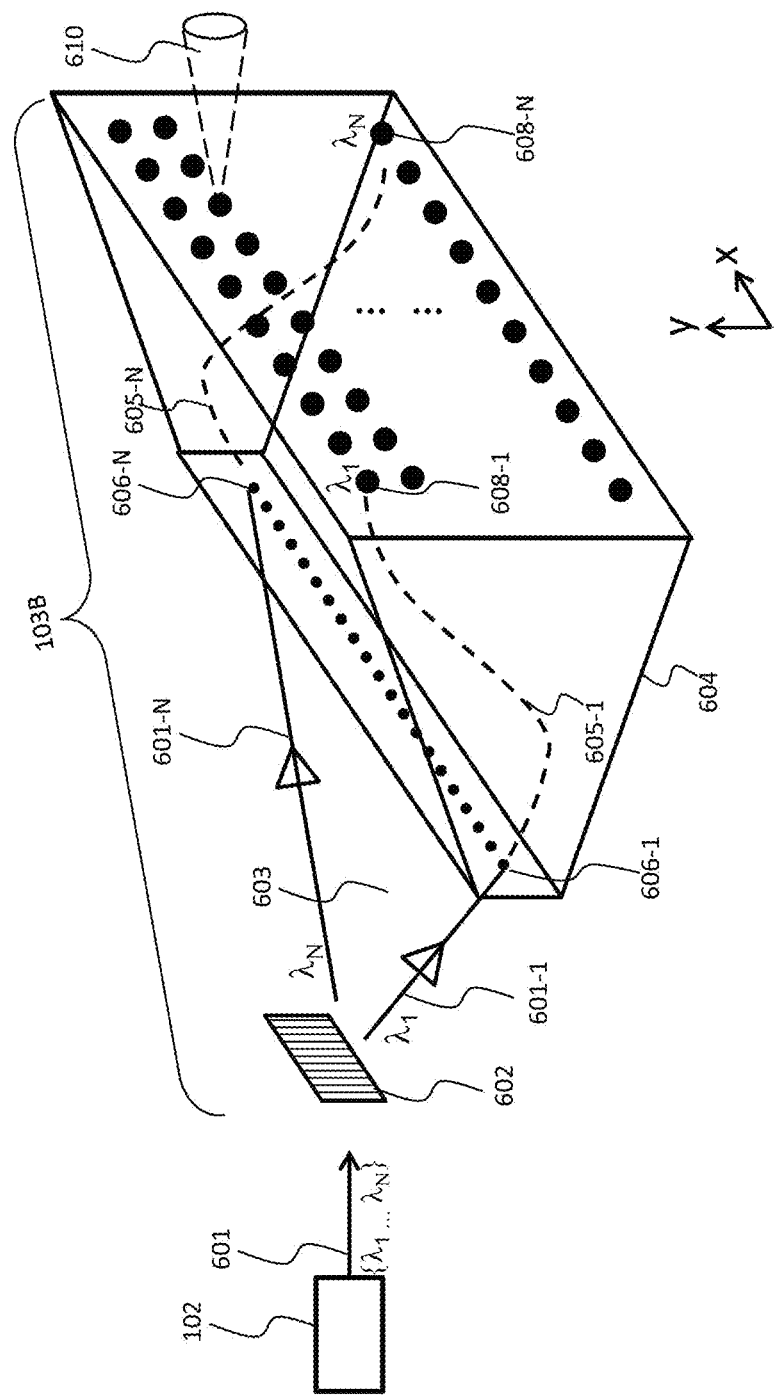
FIG. 6 illustrates schematically a second embodiment of an optical beam director.

FIG. 6 illustrates another embodiment 103B of the beam director 103 of FIG. 1. The light 601 from the light source 102 includes a selected one of N wavelength channels. The light source 102 may be a wavelength-tunable laser, allowing selection of the desired wavelength channel via an electronic control signal.

As illustrated in FIG. 6, the beam director 103B includes a dispersive element 602 arranged to direct the light over a wavelength dimension 603 (e.g. along the x-axis in FIG. 6) based on the selected one of the multiple wavelength channels $\lambda_1, \lambda_2, \ldots \lambda_N$. The beam director 103B also includes a spatial router 604 to receive the wavelength-channel-based directed light 601-1 to 601-N. The spatial router 604 includes multiple first ports (606-1 ... 606-N, collectively 606) arranged in accordance with the wavelength dimension to receive the directed light. The spatial router 604 also includes multiple second ports (608-1 ... 608-N, collectively 608), each associated with a respective one of the multiple first ports 606, arranged in two dimensions comprising the first dimension (e.g. along the x-axis) and the second dimensions (e.g. along the y-axis). The beam director 103B may include collimating optics (not shown), such as one or more GRIN lenses, to focus or collimate the wavelength-channel-based directed light 601-1 to 601-N into the multiple first ports. The spatial router 604 is configured for routing the directed light 601 from one of the multiple first ports 606 to the respective one of the multiple second ports 608. In one arrangement, the spatial router 604 includes an 1D-to-2D array of optical waveguides. The spatial router 604 may include optical waveguides 605-1 ... 605-N (collectively 605 but only two are illustrated for simplicity) for optically coupling the respective pairs of first ports and second ports.

The optical waveguides 605 may be written by direct laser writing techniques in a transparent material. One such technique involves the use of femtosecond laser pulses for controllably modifying the refractive index of the transparent material via nonlinear absorption to inscribe the waveguides 605. An example of transparent material is bulk silica, which is transparent at a wide range of wavelengths including those of the light source 102 (e.g. around the 1550 nm wavelength band for a telecommunications-grade light source) and those of the direct-writing laser (e.g. around the 810 nm wavelength band for a Ti:Sapphire femtosecond laser).

The number of wavelength channels aligned with each dimension can be arbitrary, and is determined by the direct laser writing process. For example, the N wavelength channels $\lambda_1, \lambda_2, \ldots \lambda_N$ may be grouped into M groups of wavelength channels. The M groups of wavelength channels may represent M rows or M columns of second ports 608. The M groups of wavelength channels may be $\{\lambda_1, \lambda_{M+1}, \ldots \lambda_{N-M+1}\}, \{\lambda_2, \lambda_{M+2} \ldots \lambda_{N-M+2}\}, \ldots$ and $\{\lambda_M, \lambda_{2M}, \lambda_N\}$. In another example, the M groups of wavelength channels may be $\{\lambda_1, \ldots \lambda_{N/M}\}, \{\lambda_{N/M+1}, \ldots \lambda_{2M/N}\}, \ldots$ and $\{\lambda_{N-N/M}, \ldots \lambda_N\}$). Accordingly by selecting a wavelength channel (e.g. via wavelength-tuning of the light source 102), light 601 may be routed to a corresponding one of the second ports 608. The beam director 103B may include one or more collimating elements, such a lens array (not illustrated), to collimate or focus light 610 exiting the second ports 608 (if launched into the environment 110) or entering the second ports 608 (if reflected from the environment 110). The beam direction 103B may include one or more output collimating lenses in a focal plane arrangement, similar to the collimating element 502 in FIG. 5. In this arrangement, the 2D array of output ports are configured to mapped to beam direction angles in two corresponding dimensions by transform through the one or more output collimating lenses.

Figure 7:
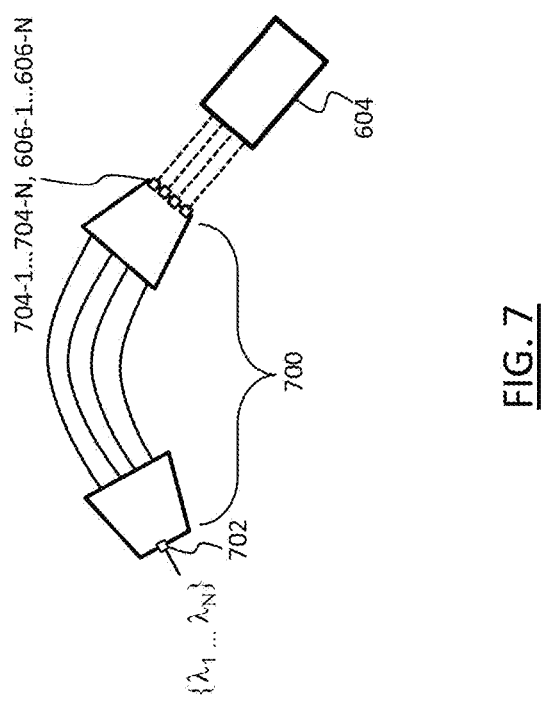
FIG. 7 illustrates an example of the second embodiment of the optical beam director.

In one arrangement, the dispersive element 602 includes any one or more of a prism, a diffraction grating and a grism. In another arrangement, as illustrated in FIG. 7, the dispersive element 602 includes an arrayed waveguide grating (AWG) 700, similar to the AWG 400 as exemplified in FIG. 4. The AWG 700 includes an input port 702 and multiple output ports 704-1 ... 704-N. The output ports 704-1 ... 704-N of the AWG 700 are optically coupled to the first ports 606-1 ... 606-N, respectively, of the spatial interleaver 604.

Now that arrangements of the present disclosure are described, it should be apparent to the skilled person in the art that at least one of the described arrangements have the following advantages:

The use of a wavelength-dependent beam director directs the outgoing light in a direction over two dimensions based on wavelength, requiring no moving parts and with no or little inertia to improve the speed of beam re-direction.

In the form an optical interleaver, the wavelength router in the first embodiment potentially maximises the wavelength range experienced by the array of dispersive elements, thereby maximise the spatial spread of the outgoing beam into the environment.

The spatial interleaver in the second embodiment allows for customability of the 1D-to-2D conversion, such as the respective numbers of rows and columns.

Embodiments of the present disclosure may be chip-based to reduce footprint and/or optical alignment requirements. For example, in the case of the beam director 103A, the wavelength router may be implemented as a waveguide-based cyclic AWG and the dispersive elements may be implemented as a waveguide-based free-space diffractive couplers. In the case of the beam director 103B, the dispersive element may be implemented as a waveguide-based AWG and the 1D-to-2D spatial interleaver may be implemented as a laser-directly-written waveguide.

Embodiments of the present disclosure may be configured for bidirectional light (e.g. outgoing light to the environment 110 as well as incoming light from the environment 110), where the outgoing path and the incoming path behave optically similarly.

Wavelength selectivity facilitates protection against interference from other light sources.

It will be understood that the disclosure disclosed and defined in this specification extends to all alternative combinations of two or more of the individual features mentioned or evident from the text or drawings. All of these different combinations constitute various alternative aspects of the disclosure.

The invention claimed is:

1. A spatial profiling system for profiling an environment, the spatial profiling system comprising:
   an optical system for directing light into the environment having a depth dimension over a first dimension and a second dimension, the second dimension substantially perpendicular to the first dimension the optical system including:
      a dispersive element arranged to direct the light based on its wavelength over a wavelength dimension;
      a spatial router for routing the light from one of multiple first ports to one of multiple second ports, the multiple first ports being arranged in accordance with the wavelength dimension, the multiple second ports being arranged along two dimensions associated with the first dimension and the second dimension; and
      a receiver for receiving light returned from the environment, the returned light containing information for determination of the depth dimension over the first dimension and the second dimension;
   a light source optically coupled to the optical system for providing the light; and
   a processing unit operatively coupled to the optical system, the processing unit configured to the determined depth dimension of the environment over the two dimensions.

2. The spatial profiling system of claim 1 wherein the dispersive element includes an arrayed waveguide grating (AWG).

3. The spatial profiling system of claim 2 wherein the spatial router includes a one-dimension to two-dimension array of waveguides.

4. The spatial profiling system of claim 3 wherein the one-dimension to two-dimension array of waveguides is inscribed by direct laser writing.

5. The spatial profiling system of claim 3 wherein the one-dimension to two-dimension array of waveguides is inscribed in a transparent material.

6. The spatial profiling system of claim 5 wherein the transparent material is transparent at each of a plurality of wavelength channels of the light source.

7. The spatial profiling system of claim 6 wherein the transparent material is further transparent at wavelengths of direct laser writing.

8. The spatial profiling system of claim 5 wherein the transparent material is bulk silica.

9. The spatial profiling system of claim 1 further comprising a collimating element to collimate the directed light.

10. The spatial profiling system of claim 9 wherein the collimating element includes a focal plane, and the dispersive element is located in the focal plane.

11. The spatial profiling system of claim 10 wherein the collimating element is a cylindrical lens.

* * * * *